(Model.)
C. N. DUTTON.
FLUID SEAL VALVE FOR METERS.
No. 404,347. Patented May 28, 1889.
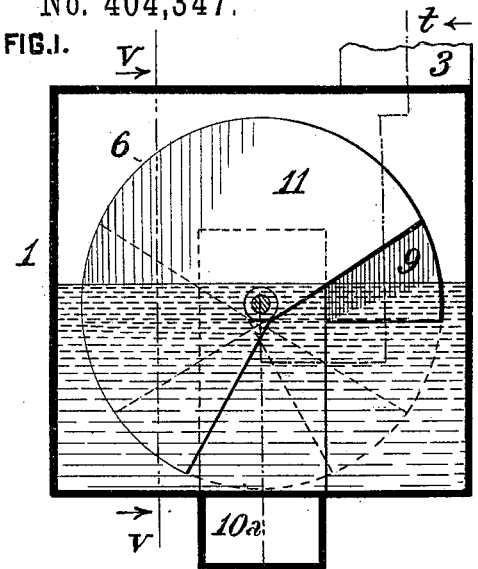
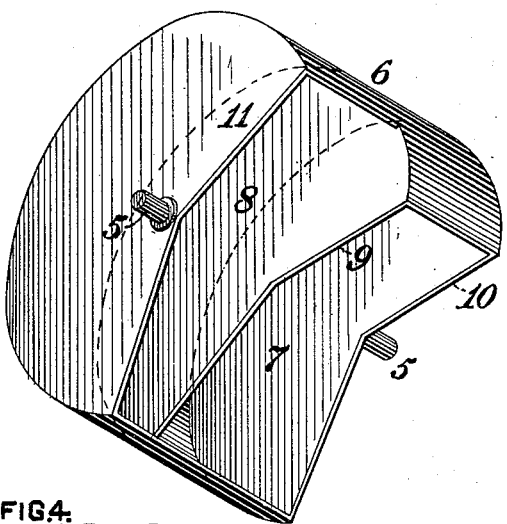
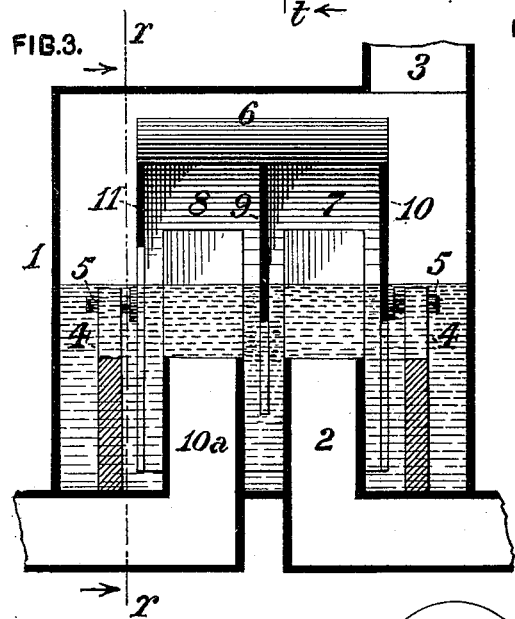
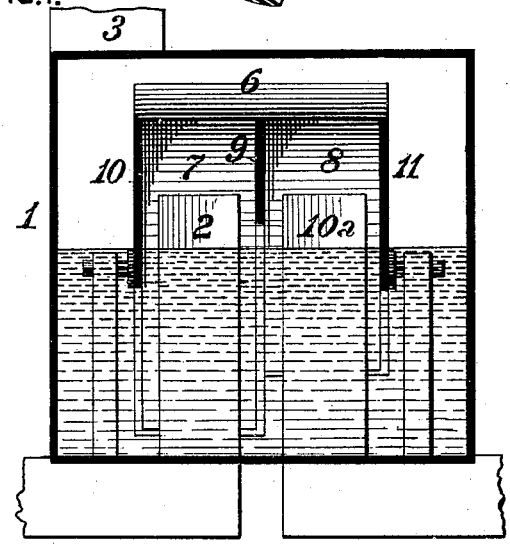
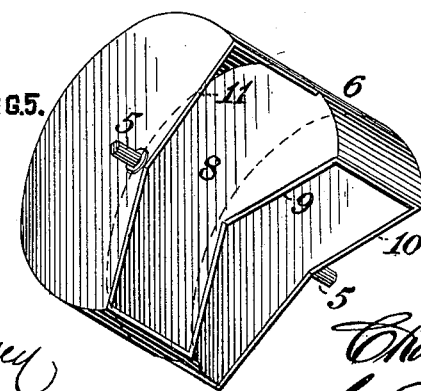
WITNESSES:
R. H. Whittesey
F. E. Gaither
INVENTOR,
Chauncey N. Dutton,
by J. Snowden Bell
Att'y.
3 Sheets—Sheet 1.

(Model.)

C. N. DUTTON.
FLUID SEAL VALVE FOR METERS.

No. 404,347. Patented May 28, 1889.

(Model.) 3 Sheets—Sheet 3.
C. N. DUTTON.
FLUID SEAL VALVE FOR METERS.
No. 404,347. Patented May 28, 1889.
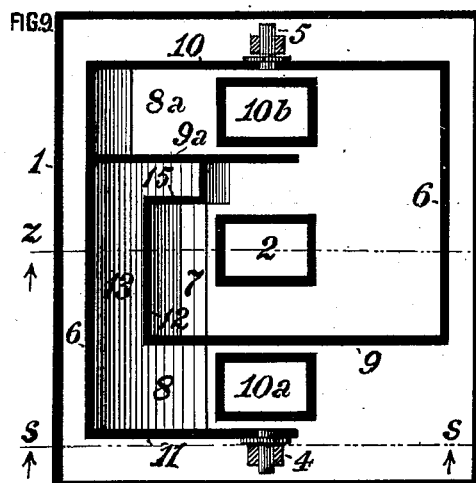
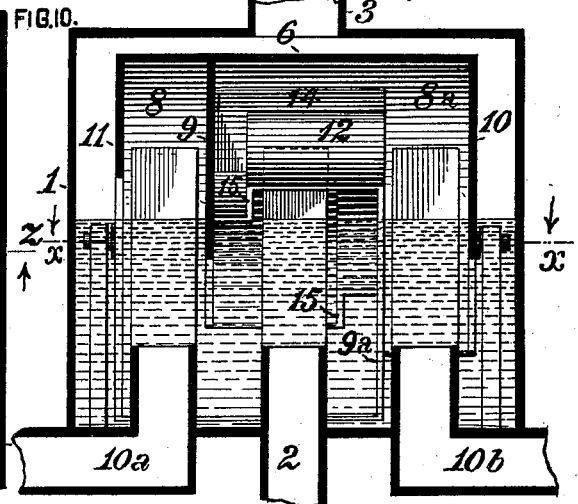
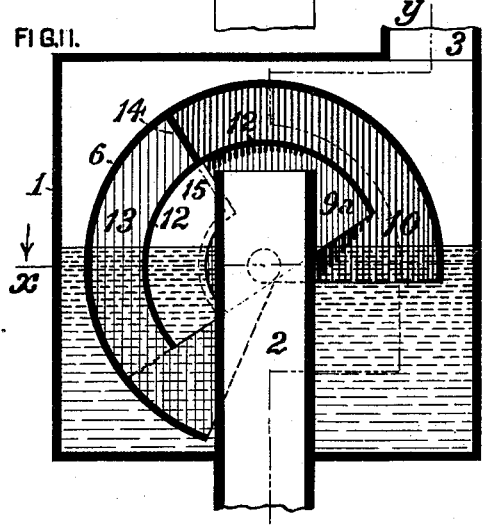
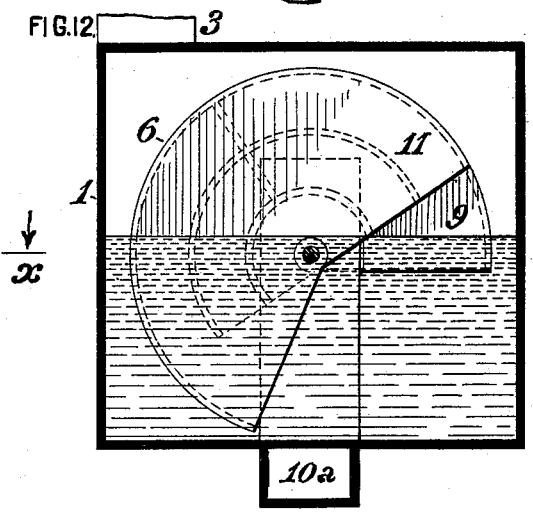
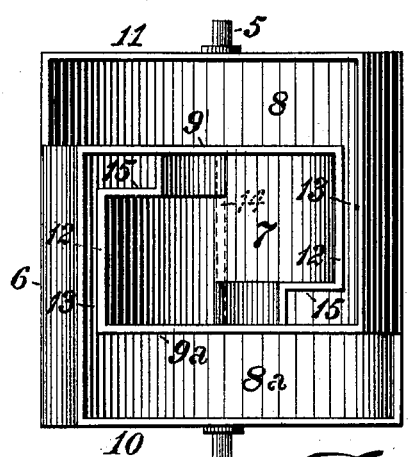
WITNESSES: INVENTOR,

UNITED STATES PATENT OFFICE.

CHAUNCEY N. DUTTON, OF PITTSBURG, PENNSYLVANIA, ASSIGNOR TO THE FUEL GAS AND ELECTRIC ENGINEERING COMPANY, (LIMITED,) OF SAME PLACE.

FLUID-SEAL VALVE FOR METERS.

SPECIFICATION forming part of Letters Patent No. 404,347, dated May 28, 1889.

Application filed August 20, 1888. Serial No. 283,224. (Model.)

*To all whom it may concern:*

Be it known that I, CHAUNCEY N. DUTTON, of Pittsburg, in the county of Allegheny and State of Pennsylvania, have invented a certain new and useful Improvement in Fluid-Seal Valves, of which improvement the following is a specification.

The object of my invention is to provide a valve in which the flow of fluids may be controlled without involving the sliding contact of metallic surfaces, and thereby to attain both a structural and an operative economy and avoid the friction and wear due to the employment of sliding valves.

To this end my invention, generally stated, consists in a shell partitioned into two or more compartments and adapted to oscillate about an axial line in a case adapted to be supplied with a sealing-fluid and provided with inlet and outlet connections, the flow of fluid between which connections is governed by the walls of the valve in the axial movements of the latter.

The improvement claimed is hereinafter fully set forth.

Figure 6:
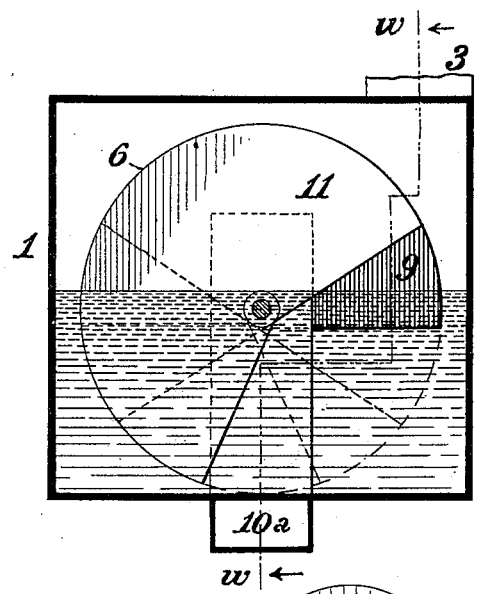
Figure 7:
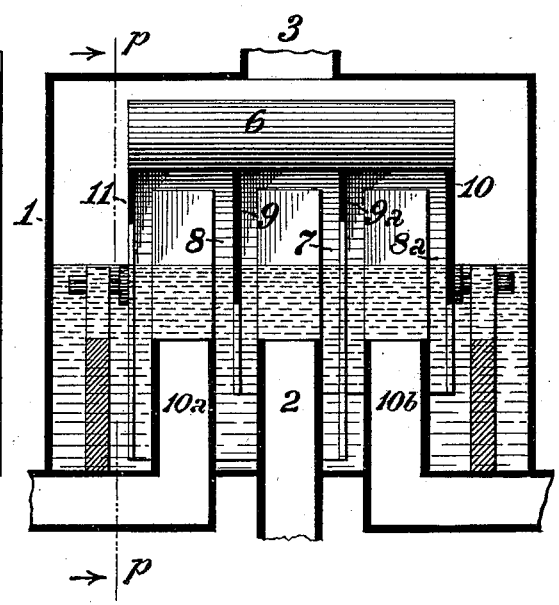
Figure 8:
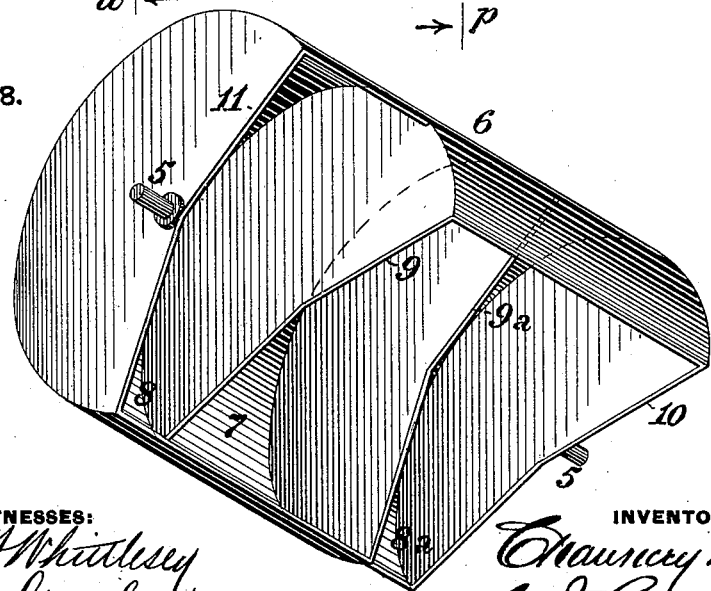

In the accompanying drawings, Figure 1 is a vertical transverse section through the casing of a fluid-seal valve embodying my invention, at the line $r\ r$ of Fig. 3; Fig. 2, a view in perspective of the valve detached; Fig. 3, a longitudinal section at the line $t\ t$ of Fig. 1; Fig. 4, a similar section at the line $v\ v$ of Fig. 1, the valve having been moved to the opposite extremity of its range of angular movement; Fig. 5, a view in perspective of a valve of modified form; Fig. 6, a vertical transverse section through the casing of a fluid-seal valve, illustrating a further modification, at the line $p\ p$ of Fig. 7; Fig. 7, a longitudinal section through the same at the line $w\ w$ of Fig. 6; Fig. 8, a view in perspective of the valve of Figs. 6 and 7 detached; Fig. 9, a horizontal section through the casing of a fluid-seal valve, illustrating a further modification, at the line $x\ x$ of Figs. 10 and 11; Fig. 10, a vertical longitudinal section through the same at the line $y\ y$ of Fig. 11; Fig. 11, a vertical transverse section at the line $z\ z$ of Fig. 9; Fig. 12, a similar section at the line $s\ s$ of Fig. 9; and Fig. 13, a bottom plan view of the valve of Figs. 9 to 12, inclusive, detached. The sections are in each instance taken looking in the direction of the arrows.

In the practice of my invention I provide a valve-casing, 1, having an inlet-pipe, 2, for the supply of fluid the movement of which is to be governed to the interior of an oscillating valve, 6, extending upwardly within it for a proper distance from a connection with a supply-pipe, an outlet-pipe, 3, leading from the upper portion of the casing to a connection with a delivery-pipe, and a channel, $10^a$, through which the passage of fluid from the interior of the valve and back to the casing and thence into the outlet-pipe 3 is effected by the movements of the valve. The valve 6, which is a shell, preferably of metal and of substantially semi-cylindrical form, is provided with end trunnions, 5, which are journaled in bearings 4, fixed to the casing, and the valve is adapted to be oscillated above the upper openings of the inlet-pipe 2 and channel $10^a$, about the axial line of the trunnions 5, by any suitable connection thereto. The casing 1 is in operation charged with a suitable sealing-fluid to a level such that the edges of the heads and partitions of the valve shall be submerged in the sealing-fluid when the valve stands in such position that said edges are approximately in a horizontal plane, thereby sealing the valve and preventing the flow of fluid through the same.

Referring first to Figs. 1 to 4, inclusive, a valve is shown by which the flow of fluid is controlled from a supply-pipe into a chamber or reservoir, as for example, the measuring-cup of a meter, and from said reservoir to a delivery or discharge pipe. The valve 6 is provided with end plates or heads, 10 11, and is divided by a transverse central partition, 9, into two chambers or compartments, 7 8, the inlet-pipe 2 extending into one of the compartments, as 7, and the channel $10^a$, which leads to a chamber or reservoir, extending into the other compartment, as 8. The lower edges of the heads 10 11 and partition 9 of the valve 6 are not on lines diametric thereof, but are in each case radially cut away, so as to be inclined relatively to a diametric plane passing through the axial line of the valve, as well as to be radially inclined relatively one to the other. As the result of such construction, those portions of the valve which unseal or rise above the surface of the sealing-fluid in the case to afford a passage for the fluid between the inlet-pipe, the channel 10$^a$, and the outlet-pipe are so relatively disposed that when the valve is in the position shown in Figs. 1 and 3 a portion of the head 11 and the adjacent portion of the semi-cylindrical shell are raised above the surface of the sealing-fluid, thereby opening free communication over said surface between the channel 10$^a$ and compartment 8 of the valve and the interior of the case 1 and outlet-pipe. At such time the partition 9, head 10, and that portion of the semi-cylindrical shell forming a wall of the compartment 7 dip into and are sealed by the sealing-fluid in the case, preventing all inflow of fluid through the pipe 2. When the valve is moved to the opposite extremity of its range of angular movement, as indicated by dotted lines in Fig. 1 and shown in Fig. 4, a portion of the partition 9 on the opposite side of the axial line of the valve to that portion of the head 11 which had been unsealed in the position first described is raised above the surface of the sealing-fluid, opening a passage above said surface between the compartments 7 and 8 of the valve and through said compartments between the inlet-pipe 2 and the reservoir-channel 10$^a$. At such time all the other members dip into and are sealed by the sealing-fluid, cutting off communication between the interior of the valve and the valve-case and outlet-pipe. The position last described is that by which fluid is transmitted from the supply-pipe 2 to the reservoir communicating with the channel 10$^a$ and that first described is that by which such fluid is thereafter transmitted from said reservoir to the outlet-pipe 3, these operations, respectively, being performed by the oscillation of the valve about its axial line into one or the other of the limits of its range of movement.

The valve shown in Fig. 5 differs from that above described in the particular that the former is adapted to charge a reservoir or vessel and subsequently to discharge it through the valve-case and outlet-pipe, while the latter is adapted to cause or permit two inlet-pipes to be alternately brought into communication with and to be cut off from, respectively, the valve-case and outlet-pipe. This difference of function is due to the fact that in the valve of Fig. 5 the relative inclination of the edges of the heads 10 and 11 and partition 9 is such that the compartments 7 and 8 are angularly equal, but oppositely disposed as to the axial line of the valve—that is to say, that the lower edges of said compartments project symmetrically in opposite directions on opposite sides of the axial line of the valve. The valve will therefore when in position corresponding with that shown in Fig. 1 unseal a portion of its head 11 and semi-cylindrical shell adjacent thereto, opening communication between the compartment 8 and the inlet-pipe opening thereinto and the valve-case and outlet-pipe, the partition 9 and the other walls of the compartment 7 being meanwhile sealed, cutting off communication between said compartment and the interior of the valve-case. When moved to the opposite limit of its range of motion, a portion of the head 10 and the shell adjacent thereto will be unsealed, opening communication between the compartment 7 and the valve-case and outlet-pipe, the partition 9 and the other walls of the compartment 8 being meanwhile sealed, cutting off communication between said compartment and the interior of the valve-case. Thus it will be seen that the edges of the partition 9 are always immersed, as are also the adjacent edges of the semi-cylindrical shell and the opposite or projecting edges of the heads 10 and 11, while the remaining portions of the edges of the heads 10 and 11 and semi-cylindrical shell are alternately sealed and unsealed, effecting the alternate discharge of the compartments 7 and 8 and the pipes opening thereinto.

In the modification illustrated in Figs. 6 to 8, inclusive, the valve is adapted to alternately admit fluid from the supply-pipe to one or the other of two channels leading to separate chambers or reservoirs and alternately deliver fluid from one or the other of said channels to a common delivery or outlet pipe. The valve 6 is divided by two partitions, 9 9$^a$, into three chambers or compartments, 7, 8, and 8$^a$, into which, when the valve is mounted in its bearings 4 in the case 1, there project, respectively, an inlet-pipe, 2, and channels 10$^a$ and 10$^b$, leading, respectively, to independent chambers or reservoirs. The lower edges of the heads 10 11 and partitions 9 9$^a$ of the valve are, as in the former instances, inclined relatively to a diametric plane passing through the axial line of the valve, as well as inclined relatively one to another.

The essential features of structural difference between the valves of Figs. 6 to 8, inclusive, and those previously described are, first, the provision of an additional compartment, and, second, the relative inclination of the heads and partitions. In this instance the heads 10 11 and partitions 9 9$^a$ are disposed alternately in pairs, having edges of similar inclination relatively to a diametric plane passing through the axial line of the valve—that is to say, the edges of the head 10 and partition 9 are parallel and similarly inclined, and the edges of the head 11 and partition 9$^a$ are also parallel and similarly inclined, but are inclined in opposite direction to those of the head 10 and partition 9.

Portions of the semi-cylindrical shell of the valve project beyond a diametric plane on each side of the axial line of the valve, uniting the adjacent extremities of the edges of the head 10 and partition 9 on one side and those of the head 11 and partition 9$^a$ on the other side, there thus being formed a projecting portion on one side of the valve communicating with the central compartment, 7, and one of the end compartments, 8, and a similar projecting portion on the opposite side of the valve communicating with the central compartment, 7, and the other end compartment, 8ª.

As the result of the above-described construction, when the valve 6 is in the position shown in Figs. 6 and 7, the edges of the partition 9, head 10, and that portion of the semi-cylindrical shell, together forming the outer walls of the compartments 7 and 8ª, dip into and are sealed by the sealing-fluid, while a portion of the edge of the partition 9ª is raised above the sealing-fluid, opening a passage above the surface thereof connecting the compartments 7 and 8ª, so that fluid can freely pass from the inlet-pipe 2 and compartment 7 into the compartment 8ª, channel 10ᵇ, and the reservoir communicating therewith. The outer walls of said compartments 7 and 8ª are at this time sealed, cutting off direct communication with the compartment 8 and with the valve-case 1 and outlet-pipe 3. At the same time a portion of the edges of the head 11 and the semi-cylindrical shell adjacent thereto are raised above the surface of the sealing-fluid, opening a passage above the surface thereof, between the compartment 8 and the valve-case, permitting free discharge of fluid from the reservoir communicating with the channel 10ª, through said channel and the compartment 8 of the valve, into the valve-case 1, and out through the outlet-pipe 3. When moved to the opposite limit of its range of motion, as indicated by the dotted lines in Fig. 6, the action of the valve is reversed, a portion of the edges of the head 10 and the semi-cylindrical shell adjacent thereto being unsealed, opening communication between the compartment 8ª and the valve-case, permitting free discharge of fluid through the channel 10ᵇ from its communicating-reservoir into the valve-case and outlet-pipe 3, while at the same time the edges of the partition 9ª, head 11, and portion of the cylindrical shell, together forming the outer walls of the compartments 7 and 8ª, are sealed, cutting off direct communication between said compartments and the compartment 8 and the valve-case. At the same time a portion of the edge of the partition 9 is unsealed, opening communication between the compartments 7 and 8, and thereby permitting fluid to flow through the inlet-pipe 2 and compartment 7 into the compartment 8, the channel 10ª, and the reservoir communicating therewith.

It will be seen that the charging of the reservoir communicating with one of the channels, as 10ᵇ, and the discharging of the reservoir communicating with the opposite channel, 10ª, are simultaneously effected, and occur when the valve is at one extremity of its range of angular movement, as that shown in Fig. 6, and that, conversely, the discharge of the reservoir communicating with the channel 10ᵇ and the charging of that communicating with the channel 10ª occur simultaneously and when the valve is at the opposite extremity of its range of angular movement, the alternate charging and discharging of the respective reservoirs being effected in and by the oscillation of the valve about its axial line.

The further modification illustrated in Figs. 9 to 13, inclusive, which similarly operates to charge and discharge two separate chambers or reservoirs from and to a common supply and a common delivery pipe, respectively, has for its object to provide an increased transmitting capacity relatively to a given diameter and traverse of the valve.

By reference to the description and illustrations of the valve last above described it will be seen that the area for the passage of fluid afforded between the middle compartment, 7, and either of the side compartments, 8 or 8ª, is the triangular space included between the unsealed portion of the edge of one of the partitions 9 or 9ª, the sealing-fluid and the inner surface of the semi-cylindrical shell, while the area for passage between either of the end compartments, 8 or 8ª, and the valve-case is equal to the sum of a similar triangle and a rectangle of a width equal to that of either of the end compartments and a height equal to the distance between the sealing-fluid and the unsealed portion of the edge of the semi-cylindrical shell bounding said compartment. It will thus appear that the charging capacity of the valve is largely exceeded by its discharging capacity, and hence the former is not the greatest which is obtainable in a valve of any given diameter and range of movement. In order to increase the charging capacity of the valve to such degree as to cause it to be equal to the discharging capacity, and thereby to attain a maximum capacity for transmission of fluid, the supplemental members shown in Figs. 9 to 13, inclusive, and which will now be described, are provided.

In the general arrangement of a semi-cylindrical shell, heads 10 and 11 and partitions 9 and 9ª, forming three separate main compartments, 7, 8, and 8ª, within the valve, the latter accords with that last previously described. In order to so far increase the area for the passage of fluid between the middle compartment, 7, and the end compartments, 8 and 8ª, as to equalize the charging and discharging capacities of the valve, I provide the same with an internal supplemental shell, 12, which is substantially of semi-cylindrical form and is concentric with the main or outer shell of the valve. The supplemental shell 12 extends circularly from the unsealing-edge of the partition 9 to the opposite unsealing-edge of the partition 9ª, being equal in width to the middle compartment, 7, of the valve, and forming an annular space, 13, around the middle compartment, 7, of which compartment the supplemental shell forms the circumferential wall, the annular space being divided longitudinally into two compartments by a partition, 14, extending from the supplemental shell 12 to the outer or main shell of the valve in a plane at right angles to those of the partitions 9 and 9ª.

Under the above construction an equalization of charging and discharging capacity is approximately, and will under certain conditions of proportion of the parts be fully, attained, and to effect such attainment under other conditions of proportion a further increase of area may be provided by additional unsealing-edges formed upon the ends of segmental partitions 15, which extend parallel to the partitions 9 and 9ª in opposite directions from the longitudinal partition 14, the outer sides of the partitions 15 being connected to the supplemental shell 12, (which, throughout the circumferential length of said outer sides afford passage for fluid into and out of the annular space 13, instead of extending solidly to the partitions 9 and 9ª, as through the remainder of its circumference,) and the inner sides of the partitions 15 being connected to the partitions 9 and 9ª, respectively.

The annular space 13 communicates on opposite sides of the partition 14 and of the middle compartment, 7, with the end compartments, 8 and 8ª, respectively, through passages cut out of the partitions 9 and 9ª on the sides of the axial line of the valve adjacent to the sealing-edges of said partitions. The heads 10 11 and partitions 9 9ª are, similarly to those of the valve last previously described, disposed alternately in pairs, having edges of similar inclination relatively to a diametric plane passing through the axis of the valve.

The operation of the valve in charging and discharging is similar to that of the valve shown in Figs. 6 to 8, inclusive, the functions performed by the additional members, which are supplemental only, being to add to the area for the passage of fluid between the middle compartment, 7, and the end compartments, 8 and 8ª, respectively, a charging area included between the surface of the sealing-fluid and the unsealing-edges of the supplemental shell 12 and the partition 15 farthest from the chamber to be charged.

While my improved valve has been herein described as operating under conditions in which the fluid to be controlled enters the casing through the pipe 2 and is discharged through the pipe 3, its operation will be equally effected without change of structure by reversing the relation of said pipes—that is to say, employing the pipe 3 as the inlet and the pipe 2 as the outlet. Further, in the position of the casing shown in the drawings the valve is adapted to be sealed in a liquid of greater specific gravity than the fluid to be controlled; but by the inversion of the casing the valve may be sealed in a fluid lighter than that which is to be controlled.

I claim as my invention and desire to secure by Letters Patent—

1. The combination of an inclosing-casing provided with an outlet-pipe and adapted to contain a sealing-fluid, an oscillating valve having two or more compartments formed in a shell by heads, and a partition or partitions the edges of which are inclined relatively to a diametric plane of the valve and to each other, an inlet-pipe extending into one of the valve-compartments, and a pipe or channel extending into each of the other compartments, substantially as set forth.

2. The combination of an inclosing-casing provided with an outlet-pipe and adapted to contain a sealing-fluid, an oscillating-valve having three compartments formed in a shell by heads, and two intermediate partitions, the edges of said heads and partitions being inclined in alternate pairs in opposite directions relatively to a diametric plane of the valve, an inlet-pipe extending into one of the valve-compartments, and a pipe or channel extending into each of the other compartments, substantially as set forth.

3. The combination, in a fluid-seal valve, of a substantially semi-cylindrical shell, two end plates or heads, and two intermediate partition-plates secured thereto and forming three compartments therein, the edges of said heads and partition-plates being inclined in alternate pairs in opposite directions relatively to a diametric plane of the valve, an inner supplemental shell forming an annular space within the valve around its middle compartment, and a longitudinal partition dividing said annular space into two sections which communicate on opposite sides, respectively, of the axial line of the valve with the end compartments thereof, substantially as set forth.

In testimony whereof I have hereunto set my hand.

CHAUNCEY N. DUTTON.

Witnesses:
J. LINCOLN RALPH,
DARWIN S. WOLCOTT.